United States Patent
Tammela et al.

(10) Patent No.: US 6,868,234 B1
(45) Date of Patent: *Mar. 15, 2005

(54) OPTICAL TELECOMMUNICATIONS NETWORK

(75) Inventors: Simo Tammela, Espoo (FI); Jaakko Aarnio, Espoo (FI)

(73) Assignee: Nokia Corporation, Espoo (FI)

(*) Notice: Subject to any disclaimer, the term of this patent is extended or adjusted under 35 U.S.C. 154(b) by 638 days.

This patent is subject to a terminal disclaimer.

(21) Appl. No.: 09/631,078

(22) Filed: Aug. 2, 2000

Related U.S. Application Data (63) Continuation of application No. PCT/FI99/00115, filed on Feb. 12, 1999.

(30) Foreign Application Priority Data

Feb. 13, 1998 (FI) .................................................. 980239

(51) Int. Cl.[7] .......................... G02F 1/00; H04B 10/20; H04J 14/02
(52) U.S. Cl. ................................ 398/59; 398/1; 398/2; 398/3; 398/4; 398/5; 398/83
(58) Field of Search ........................... 398/1–5, 12, 19, 398/45, 59, 83

(56) References Cited

U.S. PATENT DOCUMENTS

| | | | |
|---|---|---|---|
| 5,179,548 A | | 1/1993 | Sandesara |
| 5,774,244 A | | 6/1998 | Tandon et al. |
| 6,195,186 B1 | * | 2/2001 | Asahi .............................. 398/5 |
| 6,414,767 B1 | * | 7/2002 | Blair et al. .................... 398/59 |
| 6,456,407 B1 | * | 9/2002 | Tammela et al. ............. 398/59 |

FOREIGN PATENT DOCUMENTS

| | | |
|---|---|---|
| WO | 97/22190 | 6/1997 |
| WO | 98/04058 | 1/1998 |

OTHER PUBLICATIONS

Sep. 7, 1999, International Search Report for PCT/FI99/00115.

* cited by examiner

*Primary Examiner*—M. R. Sedighian
(74) *Attorney, Agent, or Firm*—Squire, Sanders & Dempsey L.L.P.

(57) ABSTRACT

The invention relates to an optical telecommunications network comprising several nodes (N1 to N4) connected to one another by optical transmission paths that form several working rings (R1 to R4), each of which passes via each node. Information is transmitted in the network at several different wavelengths. To ensure that the network can be implemented as cost-effectively as possible, it comprises a group of nodes (N1 to N4) including N nodes, a group of working rings (R1 to R4) including N rings, and a group of wavelengths ($\lambda_1$ to $\lambda_4$) including N wavelengths in such a way that each node in the group of nodes is configured to transmit signals at one wavelength in the group of wavelengths to all rings in the group of rings except to the ring from which it receives signals, and to receive signals at all wavelengths in the group of wavelengths except for its own transmitting wavelength from both directions in only one of the rings in the group of rings. Each node has an individual wavelength specific to the node, the said wavelength being one of wavelengths in the said group of wavelengths, and a reception ring specific to the node, from which the other nodes in the group of nodes do not receive.

5 Claims, 8 Drawing Sheets

OPTICAL TELECOMMUNICATIONS NETWORK

This application is a continuation of international application serial number PCT/FI99/00115, filed 12 Feb. 1999.

FIELD OF THE INVENTION

The invention relates to optical telecommunications in general, and in particular to an optical telecommunications network that uses Wavelength Division Multiplexing (WDM).

BACKGROUND OF THE INVENTION

Figure 1A:
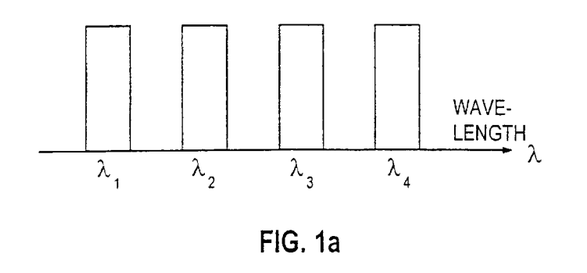
FIGS. 1a and 1b illustrate an optical transmission system that makes use of wavelength division multiplexing.
Figure 1B:
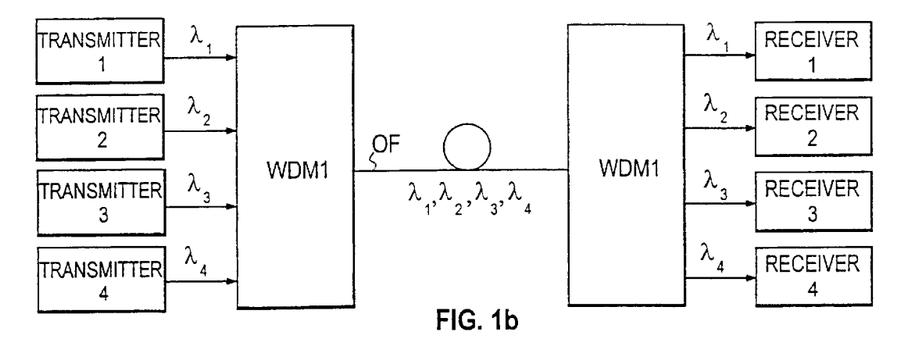

Wavelength division multiplexing (WDM) is an efficient way of multiplying the capacity of optical fibre. In wavelength division multiplexing, several independent transmitter-receiver pairs use the same fibre. FIGS. 1a and 1b illustrate the principle of wavelength division multiplexing, using as an example a system having four parallel transmitter-receiver pairs. Each of the four information sources (not shown in the figure) modulates one of four optical transmitters, each of which generates light at a different wavelength ($\lambda_1 \ldots \lambda_4$) As will be seen from FIG. 1a, the modulation bandwidth of each source is smaller than the distance between the wavelengths, and thus the spectra of the modulated signals do not overlap. The signals generated by the transmitters are combined onto the same optical fibre OF in a WDM multiplexer WDM1, which is a fully optical (and often passive) component. At the opposite end of the fibre, a WDM demultiplexer WDM2, which is also a fully optical (and often passive) component, separates the different spectral components of the combined signal from one another. Each of these signals is detected at a discrete receiver. Hence, a narrow wavelength window is assigned for the use of each signal in a given wavelength range. A typical practical example might be a system where the signals are in the 1550 nm wavelength range for example in such a way that the first signal is at the wavelength 1544 nm, the second signal at the wavelength 1548 nm, the third signal at the wavelength 1552 nm and the fourth signal at the wavelength 1556 nm. Nowadays a multiple of 100 GHz (approx. 0.8 nm) is becoming the de facto standard for the distance between wavelengths.

In order to enable a given wavelength channel to be branched off a transmission link using wavelength division multiplexing or a given wavelength channel to be added thereinto, an element called an add/drop filter has been developed. The task of an optical add/drop filter is (1) to direct off a selected narrow-band channel (wavelength) from the optical aggregate signal that passes in the fibre incoming to the filter (drop function) and/or (2) to add to the fibre outgoing from the filter a narrow-band channel (add function). The signals (wavelengths) that have not been selected for dropping pass through the add/drop element from the incoming fibre to the outgoing fibre. Thus a desired narrow-band channel is added or dropped in the filter without otherwise affecting the spectrum of the optical aggregate signal in any way (providing that free wavelengths are available in the fibre involved).

Figure 2:
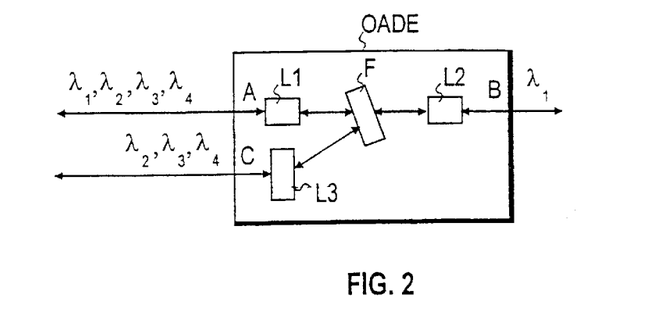
FIG. 2 shows a known add/drop filter that can be used to add/drop a single wavelength.

FIG. 2 illustrates the structure of a known three-port add/drop filter OADE. References L1 . . . L3 denote port-specific lenses and reference F an interference filter. The incoming fibre is connected to port A, through which a number of wavelength channels ($\lambda_1 \ldots \lambda_4$) arrive. One of the wavelength channels (in this example $\lambda_1$) passes through the interference filter F (and lenses L1 and L2) to port B. The remaining wavelength channels also pass through lens L1 but are reflected from the interference filter (through lens L3) to port C. The wavelength of the channel entering port B is a fixed, filter-specific constant.

The filter operates in both directions, and hence the adding function is achieved in such a way that the existing channels are fed to port C and a channel to be added to port B, and hence all channels are obtained from port A.

A three-port filter of the kind described above is manufactured for example by Optical Corporation of America, U.S.A.

The existing optical telecommunications systems based on wavelength division multiplexing have mostly been point-to-point systems used on high-capacity long-distance connections (trunk lines). However, optical transmission technology is being continually developed to be able to implement the lowest layers of broadband network architectures as fully optical systems, which would make it possible to handle the transmission of high-capacity information flows by purely optical means (i.e. using optical cross-connection and routing).

After the point-to-point systems, optical networks allowing add/drop functions, such as ring networks, will be the next step in this development. To make it possible to configure this type of network flexibly in response to traffic loads, add/drop filters nave been upgraded to network elements allowing free selection of the wavelengths to be dropped and/or added. This type of add/drop device is, thus, a network element that can be configured to allow free selection of the wavelengths to be dropped/added.

Figure 3:
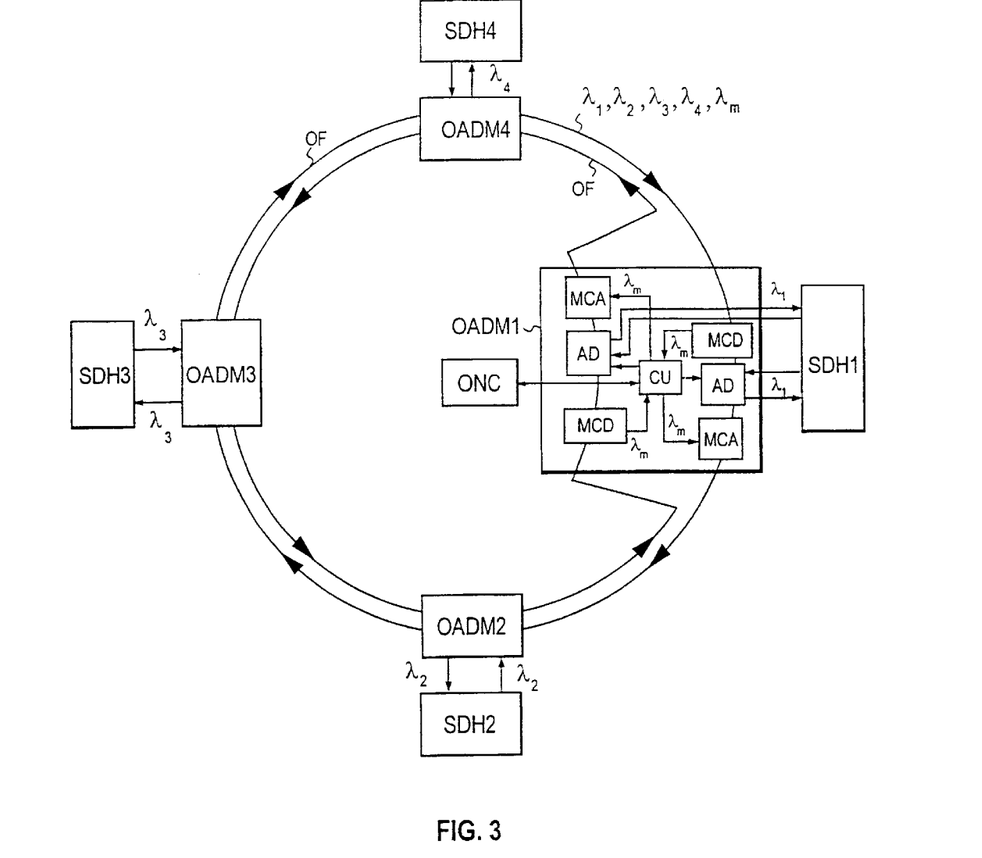
FIG. 3 illustrates a known optical ring network.

The following section will provide a brief description of a typical ring network with reference to FIG. 3. In the example shown in FIG. 3, the network is used for transmitting SDH (Synchronous Digital Hierarchy) signals, but the type of signal carried by each wavelength can, naturally, vary. The signal may be any analog or digital signal, such as a PDH (Plesiochronous Digital Hierarchy) signal or an ATM (Asynchronous Transfer Mode) signal.

In this example, the ring network features four nodes consisting of the add/drop devices OADM1 to OADM4. For both directions of transmission, there is a dedicated ring. Between the nodes, there is an optical transmission connection consisting of optical fibres OF, and wavelength division multiplexing, as described above, is used on each one-way connection between two nodes. In the example, four wavelengths ($\lambda_1 \ldots \lambda_4$) and one management wavelength ($\lambda_m$) are used, but it is understood that the number of wavelengths used in the network may vary and be even higher. Each add/drop device may have an interface to the control system ONC of the device and/or of the entire optical network, which allows all the add/drop devices in the network to be configured as desired.

The equipment in an optical network can be integrated with SDH equipment and the optical control system may be integrated with the control system of the SDH equipment. The optical signal from the SDH device is connected to the ring network at the selected wavelength. A desired number of wavelengths is defined for node-to-node connections in accordance with the traffic needs. In other words, the routing configurations corresponding to the various wavelengths can be changed in response to traffic load. Using the management signal carried by the management wavelengths, it is possible to configure each individual node to drop/add the desired wavelengths. As shown in the figure at node OADM1, there may be a dedicated drop element MCD for node management wavelength in both directions to drop the control channel at the management wavelength $\lambda_m$ to the node control unit CU, which, then, converts the signal into an electric signal and controls the add/drop part AD of the node as indicated by the management signal to drop the desired channels into the SDH equipment and to add the desired wavelengths from the SDH equipment. In addition to the drop element, there is an add element MCA for both transmission directions to add the management channel from the control unit CU to the signal being transmitted by the node.

Node management can also be effected directly by means of a local control interface (optical or electric) to control each node individually through the local interface; node management can also be effected using both a local control interface and the network management channel, so that a signal can be connected to the network management channel via the local control interface.

Each wavelength can, for example, be used to carry an STM-N (Synchronous Transport Module) signal, such as STM-16 (N=16). In the example of FIG. 3, it has been simply presumed that wavelength $\lambda_1$, corresponds to SDH device SDH1, wavelength corresponds to SDH device SDH2, wavelength $\lambda_3$ corresponds to SDH device SDH3 and wavelength $\lambda_4$ corresponds to SDH device SDH4.

One important consideration besides the cost-effectiveness of the network is its reliability in operation. To ensure this, ring networks usually feature a protection system with optical switches to make it possible to create the required connection via the remaining ring in the event that a connection between two nodes fails.

Figure 4:
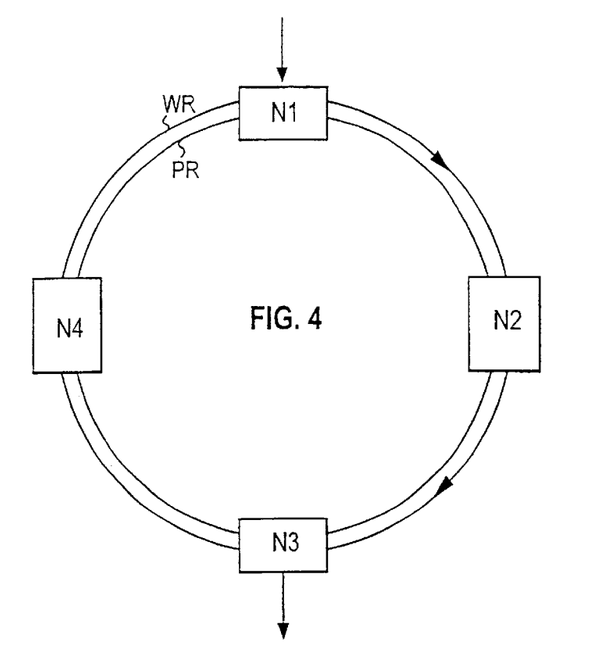
FIGS. 4 and 5 illustrate a known protection system.
Figure 5:
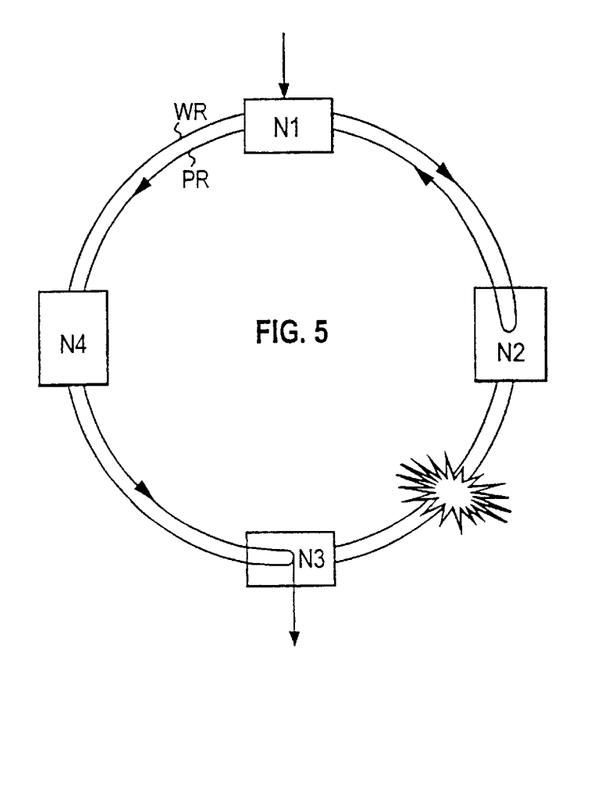

FIGS. 4 and 5 illustrate a typical protection system. Network nodes N1–N4 are inter-linked by two separate rings: working WR and protection ring PR. Normally, when the network is operating faultlessly, the signal is carried in one direction along working ring WR and the desired signals are dropped/added at the nodes (FIG. 4). If a fault occurs, when, for example, the connection between two nodes fails, as exemplified by nodes N2 and N3 in FIG. 5, the signal is switched from the working ring to the protection ring at the node (N2) in the working ring located before the failure point, and from the protection ring to the working ring at the node (N3) located after the failure point. Thus, the signal travels along the working ring in the forward direction and along the protection ring in the return direction. The arrows in the figures show the route of one wavelength channel from node N1 to node N3 in both cases.

With the increased use of ring networks, optical telecommunications networks will increasingly be implemented as networks covering a more limited geographical area. In the next phase, the networks will typically be regional networks with a diameter of 10 to 100 km. Since the number of nodes and different interfaces in such networks will increase dramatically, it is of growing importance that the network and protection system can be built using a minimum number of components. This is of special importance in the initial phase because the WDM technology is still expensive for the user. Moreover, it is vital that all the components can be manufactured using existing and economically feasible technology. A drawback of the protection system described above, for example, is that if the add/drop devices are only used in the working ring, the signal path for the completion of the required functions becomes rather long. This is due to the fact that at some nodes channel dropping/addition will not take place until the signal returns along the working ring (WR). As a result, extra amplification may have to be provided in the network just to ensure that the protection system will work.

Another important point in the interest of cost-effectiveness is that the node transmitters and receivers can be implemented at as low a cost as possible. As far as optical receivers are concerned, they are capable of receiving several wavelengths. However, transmitters, for example, usually operate only at one wavelength. Transmitters operating at multiple wavelengths have been developed, but they are clearly more complicated to manufacture and manage than single-wavelength transmitters. Therefore, it would be useful if networks where a connection can be established between any two nodes (such as in a total mesh network), would, at least initially, be able to manage with one single-wavelength transmitter at each node (excluding the spare transmitter).

SUMMARY OF THE INVENTION

The object of the invention is to provide an optical telecommunications network that will help to achieve the objectives described above as effectively as possible.

This is accomplished by the solution defined in the independent patent claims.

From the point of view of network architecture and functionality, there are two parameters that can be used to influence the cost-effectiveness of the basic architecture: the (number of) wavelengths used, and the fibres to which each wavelength is fed. The invention is based on the fact that usually when installations are made, a number of extra optical fibres are laid in anticipation of future needs. Since the existing installations already incorporate such "dark" or single-wavelength fibres, they can now be utilised and so reduce the number of WDM components required. The invention makes use of SDM (Space Division Multiplexing) technology, where different channel groups are transmitted along the fibres of one cable.

The idea is to use N nodes, N working rings and N wavelength channels to create an operational network or sub-network where each node is capable of transmitting, at one wavelength, to all other working rings except the one from which it receives, and to receive from both directions in only one of the rings at all wavelengths except the wavelength at which it transmits. With this layout, no add/drop is required at the nodes because the receiving node is determined by the destination ring. Thus, the nodes do not need to be able to separate wavelengths from one another.

When, in addition, the node is constructed to transmit simultaneously in both ring directions, or in either direction in individual rings, no special protection system is required in the network; instead, failures can be remedied by either selecting the right reception direction at the receiving end or by reversing the transmitting direction at the selected nodes. Thus, the protection system is, so to speak, embedded or built into the network, and no special fibres for the protection system are required.

Furthermore, a solution in accordance with the invention makes it possible to manage with even one single-wavelength transmitter at each node to enable the node to set up a connection with any other node in the network. However, the use of several transmitter components in the node offers the benefit of having one of them serve as a spare unit for all the other transmitters.

The basic structure of the network also allows flexible extension. In other words, new connections and nodes can be added to the network with great flexibility.

LIST OF DRAWINGS

The inventions and its preferred embodiments are described in more detail with reference to FIGS. 6 to 12*b* using the examples illustrated in the attached drawings, in which.

DETAILED DESCRIPTION OF THE INVENTION

Figure 6:
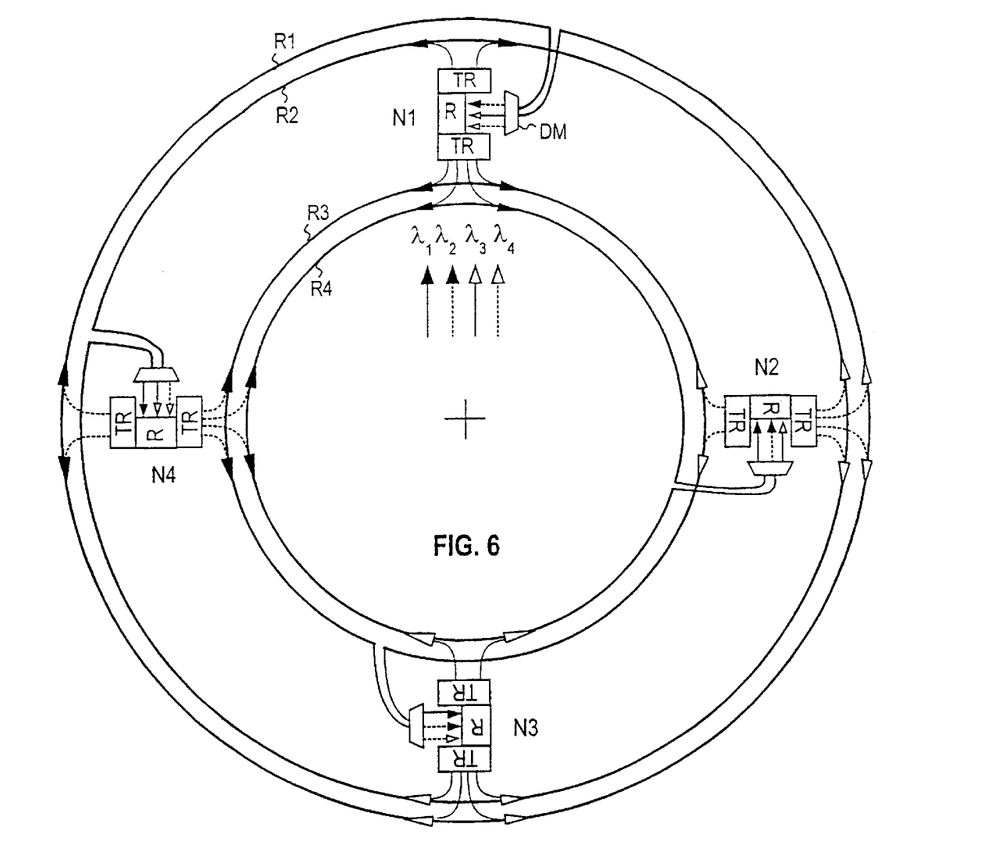
FIG. 6 shows a network according to the invention.

In FIG. 6, the optical network in accordance with the invention is shown in its basic set-up, i.e. in a set-up where only one wavelength channel exists between any two nodes. However, the network is complete in the sense that any one node is capable of communicating with any other node in the network.

The network shown as an example in FIG. 6 features a total of four nodes N1 to N4, numbered clockwise starting from the topmost node in the figure. The nodes are interconnected by a total of four fibre rings R1 to R4 (numbering starting from the outermost ring towards the innermost).

The network operates at four wavelengths $\lambda_1$ to $\lambda_4$, represented in the figure by different arrows such that wavelength $\lambda_1$ is represented by an arrow consisting of a solid line and a black head, wavelength $\lambda_2$ by an arrow consisting of a broken line and a black head, wavelength $\lambda_3$ by an arrow consisting of a solid line and a white head, wavelength $\lambda_4$ by an arrow consisting of a broken line and a black head. Each node transmits at a single wavelength specific to that particular node.

For each node, the figure shows the receiver R and transmitter TR which, for the sake of charity, is depicted as split into two on both sides of the receiver R. In addition, the figure shows, for each node, the demultiplexer DM (reference mark only for node N1), which separates (using a known technique) the wavelengths coming in from the incoming fibre and directs them to their respective reception fibres connected to the node receiver R. The different arrows at each demultiplexer output indicate the wavelengths arriving at the node from each fibre.

As the figure shows, each node receives signals from a specific (single) ring. Both ends of every ring are connected to serve as inputs to the demultiplexer of a certain node. In other words, each node has a ring of its own and is capable of receiving signals from both directions in that ring; node N1 receives signals from ring R1, node N2 from ring R4, node N3 from ring R3, and node N4 from ring R2. Each node transmits signals at its specific wavelength to all other rings except the one from which it receives signals. In the first embodiment of the invention, transmission takes place in one direction at any given time, but the direction of transmission to each ring is selectable. Node N1 transmits at the wavelength $\lambda_1$, node N2 at the wavelength $\lambda_4$, node N3 at the wavelength $\lambda_3$, and node N4 at the wavelength $\lambda_2$. In the figure, the different arrows drawn from the transmitter representing each wavelength illustrate the transmission wavelength used by each node and the directions in which the node is capable of transmitting. Although, in this first embodiment of the invention, the node can transmit only in one direction in any individual ring at any one time, it is still capable of transmitting in different directions in different rings, as will be shown.

Figure 7:
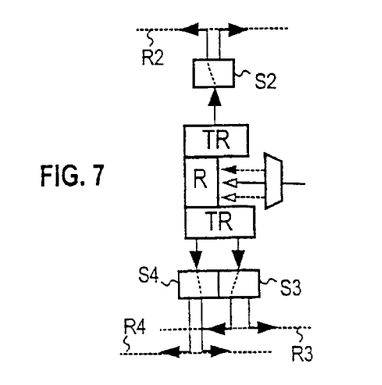
FIG. 7 illustrates the transmission operation of a single node in the network shown in FIG. 6.

FIG. 7 illustrates the operation of a single transmitter using transmission by node N1 as an example of a situation where each node transmits only in one direction in the ring. The transmission to each ring Ri (for node N1 i=2, 3, 4) is directed via switch Si (i=2, 3, 4). The direction of the transmission to each ring is selected by a switch specific to that ring. The switches are individually controlled. In other words, the direction of transmission can be individually selected for each ring.

Figure 8:
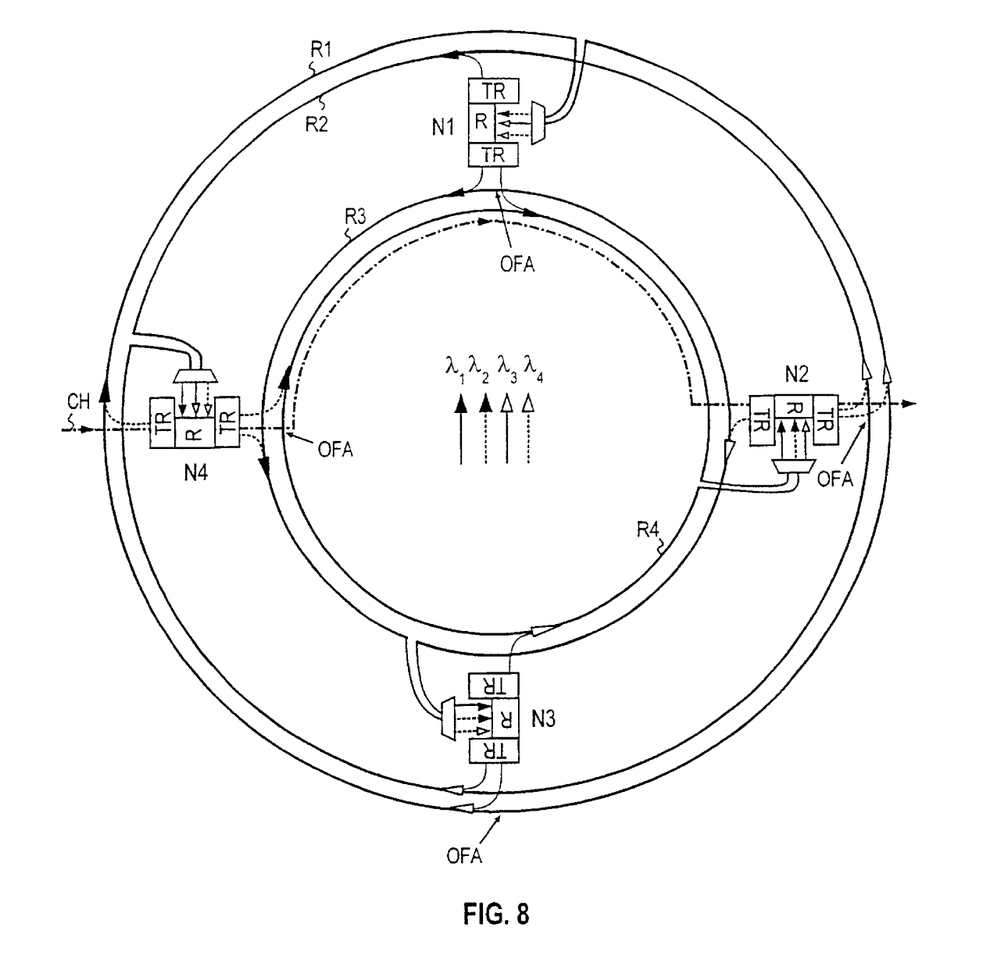
FIG. 8 shows the normal operation of the network shown in FIG. 6.

FIG. 8 illustrates the normal operation of the network shown in FIG. 7. Then, it is preferable to select the direction of transmission at each node so that communications between two nodes takes place in both directions along the same route. The figure shows the routes via which each node in the case used as the example is capable of communicating with the other nodes. When a node wishes to communicate with another node, it transmits in the selected direction of transmission to the ring from which the other node receives. For example, if node N1 wishes to communicate with node N2, it transmits to ring R4. When node N2, in turn, wishes to transmit to node N1, it transmits at its specific wavelength to ring R1. To ensure that both directions of transmission use the same route, node N1 transmits in the clockwise direction and node N2 in the anti-clockwise direction, as shown in the figure, or vice versa, in which case the route goes via nodes N3 and N4.

Figure 9:
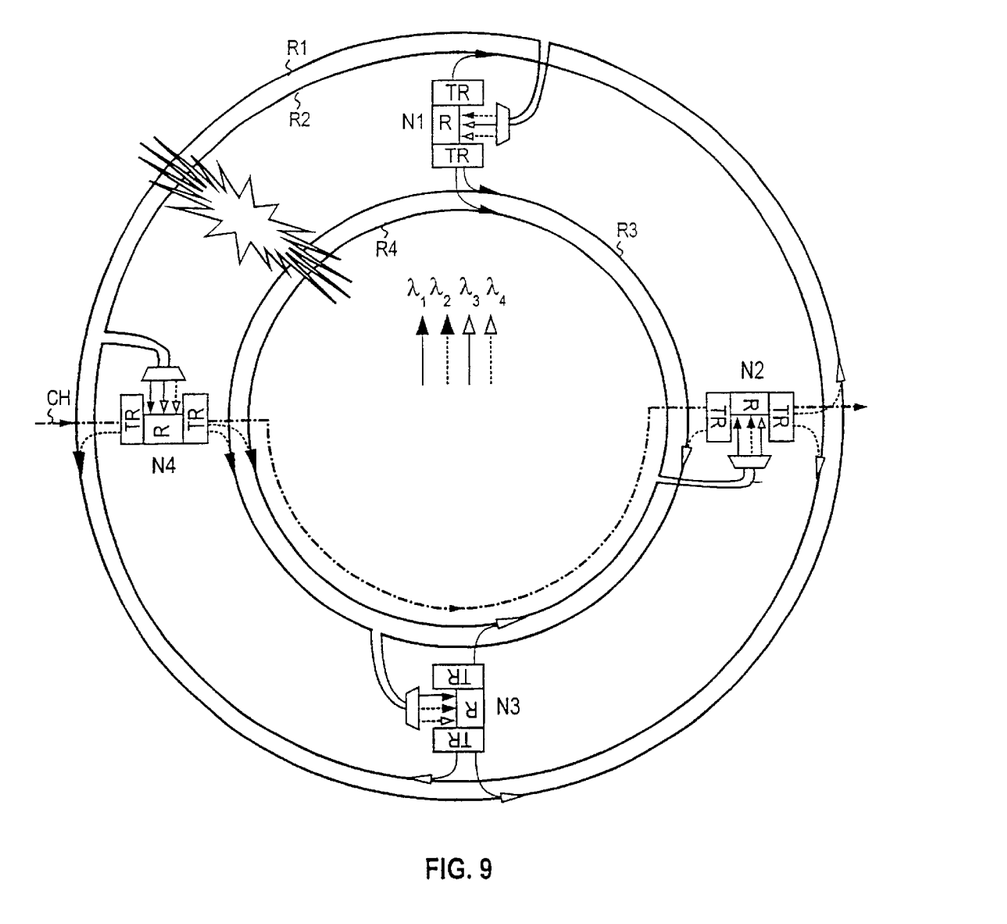
FIG. 9 shows the network of FIG. 6 in one failure situation.

For example, if the connection between nodes N1 and N4 fails in the network shown in FIG. 8, a situation illustrated in FIG. 9, the direction of transmission is reversed at node N1 for rings R2 and R3, at node N2 for ring R2, at node N3 for ring R1, and at node N4 for rings R1 and R4. By changing the direction of transmission as described above, each node is, despite the failure, still capable of communicating with any other node. In FIGS. 8 and 9, the broken dotted line CH represents, by way of an example, the route of one wavelength channel through the network from node N4 and to node N2.

Figure 10:
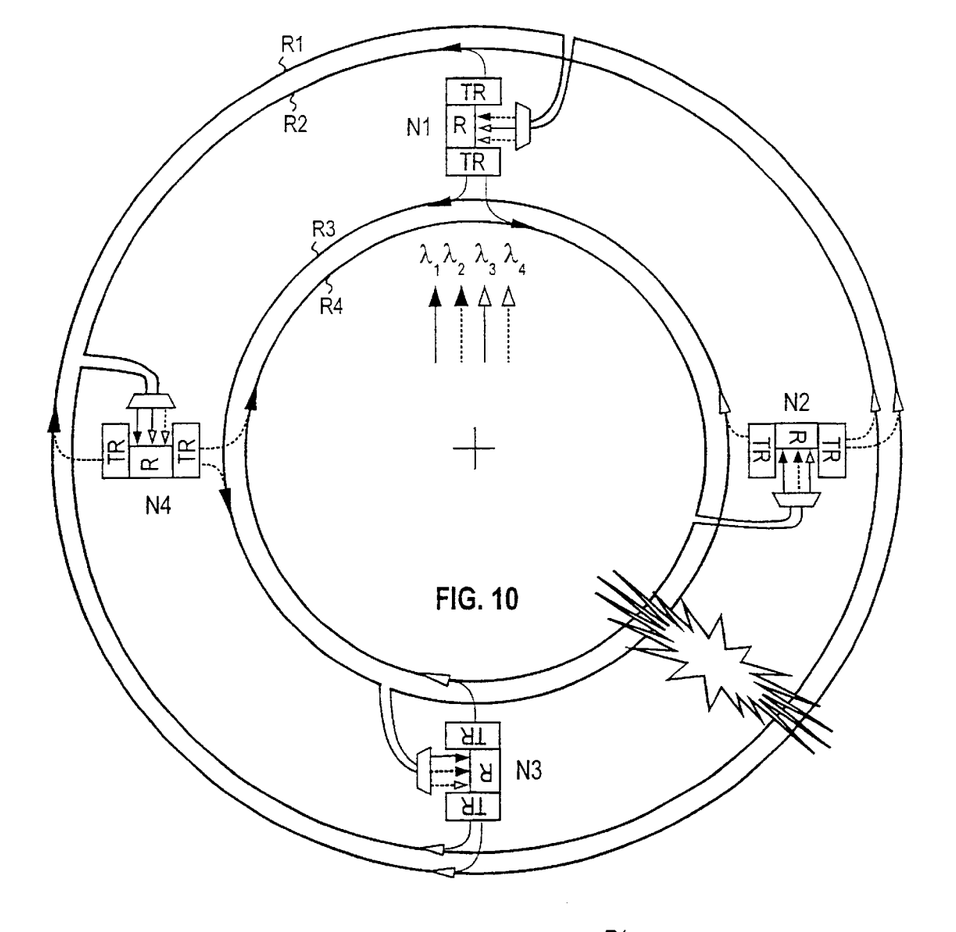
FIG. 10 shows the network of FIG. 6 in another failure situation.

If, however, the connection between nodes N2 and N3 fails, as shown in FIG. 10, the direction of transmission of node N2 to ring R3 is reversed and that of node N3 to ring R4 as well. The direction of transmission of nodes N1 and N4 remains unchanged.

In the above manner, the direction of transmission of the nodes to different rings is changed depending on the failure point so that the failure point does not remain between the transmitting and receiving node. Another advantage of the invention is that if several breaks or failures take place simultaneously, the normally operating sections of the network are unaffected. Moreover, faults on the higher network layers will not interfere with the operation of the optical layer.

According to the second embodiment of the invention, each node transmits simultaneously in both directions to its transmission fibres, while the receiving end makes the decision as to which direction each wavelength is received from. At the receiving end, there may be (a) one transmitter at each node that transmits in both directions simultaneously, or (b) two separate transmitters transmitting in opposite directions. Conversely, at the receiving end, there may be (a) one receiver before which matching signals are compared and a decision is made as to which direction each signal is received from, or (b) two receivers after which a decision is made in respect of each wavelength as to the direction from which the signal to be used is received.

The advantage of this second embodiment, with the nodes transmitting simultaneously in both directions, is that, in the event of a failure, it is not necessary to forward the switch reversal data to the nodes; instead, the transmitter of each node is capable of quickly changing the direction of reception.

Figure 11:
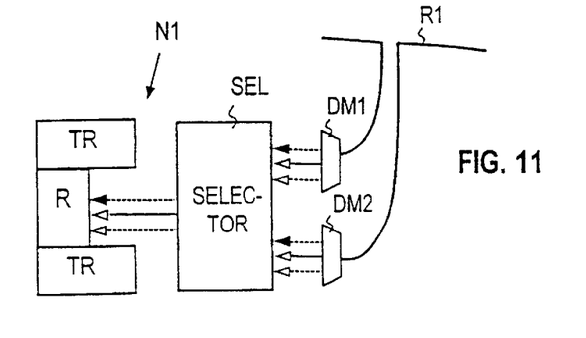
FIG. 11 illustrates reception by a node in a situation where the nodes transmit simultaneously in both directions.

FIG. 11 illustrates the foregoing example by showing reception at node N1 using the method described above. Because the nodes continuously transmit in both directions, the (three) signals received from the demultiplexer (DM1, DM2) for each direction of reception are identical, and it will not be until the selector SEL placed after the demultiplexers that a decision is taken as to the direction from which each wavelength is received. It is also possible to detect all optical signals and to decide the direction of reception for each wavelength later on the electrical side of the receiver.

To clarify the actual invention, a network utilizing one wavelength channel between two nodes was used as an example. To increase the capacity of a ring network (such as the "basic network" shown in FIG. 6), there may be more than one wavelength channel or more fibres or fibre rings than shown in the foregoing examples. However, what is essential is that the type of pool described above with N nodes, N fibre rings, and N wavelength channels is used as explained. Thus, a network based on such a pool may constitute an independent network or serve as a sub-network in a larger network.

Moreover, the nodes need not be physically removed from one another, but several nodes can be located at one point. The node or its components can be distributed across the network, which makes it possible to provide additional channels where needed. The description provided above relates, in fact, to the logical structure of the network because its physical configuration may vary.

Since the receiver is determined by the fibre to which the signal is transmitted, it is not necessary, in a network in accordance with the invention, to distinguish between individual wavelengths at the node for carrying out the drop function. Even if the number of working rings in the network were higher than normal, the total number of fibres need not be greater than usual because no protection rings are required.

Also, the network in accordance with the invention is scalable on the optical layer by preserving the physical ring topology. Scalability means that the logical connections within the network are not broken when logical connections or nodes are added or removed. In addition, the network is, to a limited extent, scaleable on the optical layer into an arbitrarily connected physical and logical mesh topology. Moreover, the network is freely expandable by allocating network resources on the optical and electric layer.

When the physical ring topology is retained, the traffic matrix of the network can be reorganised in such a way that a logical connection can be set up between any two nodes using an optical channel. (The traffic matrix indicates the logical connections between the nodes.) In an arbitrarily connected physical and logical mesh topology, the traffic matrix can only be reorganised to a limited extent. In sub-networks, the reorganisation can be carried out by providing a logical connection between any two nodes on an optical channel. In an arbitrarily connected physical and logical mesh topology, the traffic matrix can be freely reorganised (within the limits imposed by network resources) by sharing network resources on the optical and electric layers.

Figure 12A:
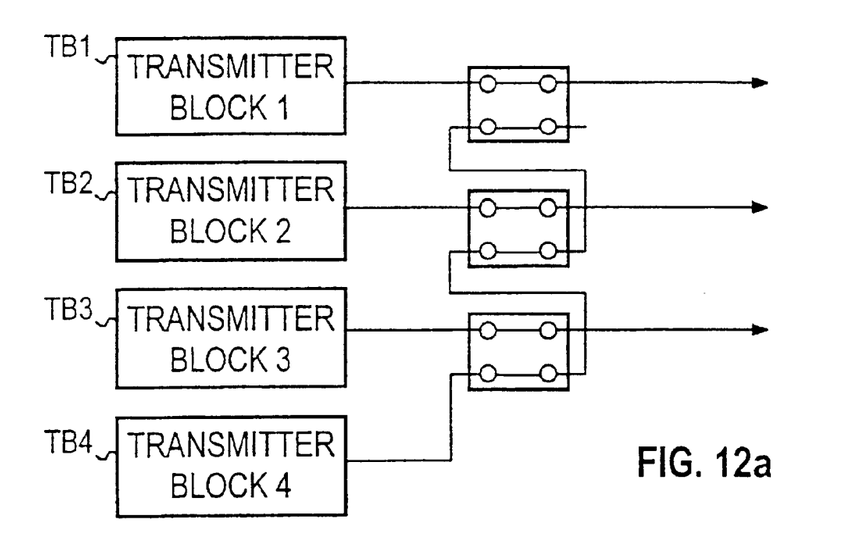
FIGS. 12a and 12b illustrate the use of spare transmitter in a node.
Figure 12B:
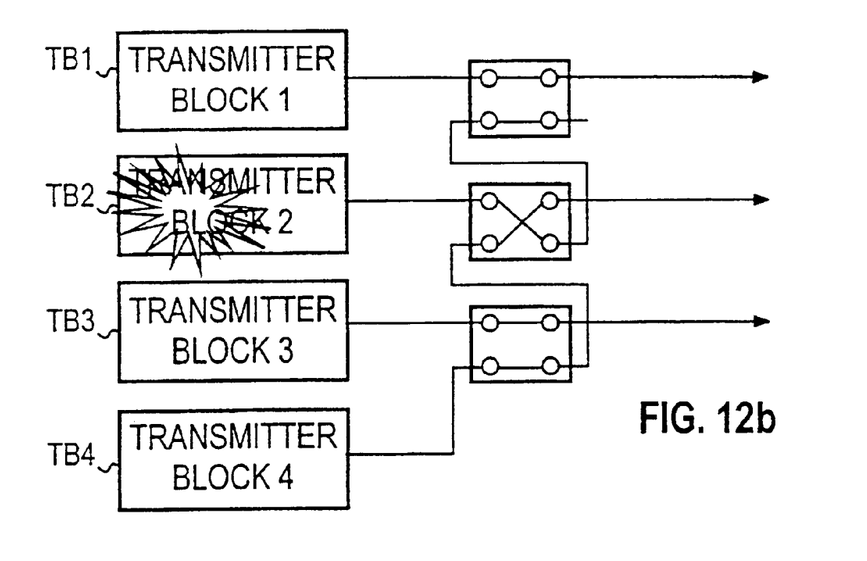

Another advantage offered by the solution in accordance with the invention is that if several transmitter components are used in the network, one transmitter component can serve as a common spare transmitter unit for all other transmitter units because they all transmit at the same wavelength. FIG. 12a illustrates a situation with three transmitter blocks TB1 to TB3 that are used in normal operation. The output of each operational transmitter block is connected to one of the two inputs of the corresponding optical 2×2 switch. In normal operation, all the switches are in the through-connection position as shown in FIG. 12a. The fourth transmitter block TB4 at the node is a common spare transmitter block whose output is connected through all the switches. If one of the transmitters fails, the corresponding switch is directed into the cross-connection position and the signal of the spare transmitter replaces that of the failed transmitter (and vice versa). FIG. 12b gives an example of a situation where transmitter block TB2 has failed.

Although the invention has been described above by means of examples with reference to the related drawings, it is obvious that the invention is not limited to the said embodiments but can be varied within the concept of the invention as presented in the attached patent claims. For example, various components, such as amplifiers, can be added to the network. If, for example, the network is so extensive that the length of the ring exceeds the maximum distance between a transmitter-receiver pair, optical amplifiers can be installed in the network. Such amplifiers should preferably be placed at the points indicated by OFA in FIG. 8. Depending on whether the protection direction is in operation, the direction of the amplifier may have to be changed. However, no simultaneous bi-directional amplification is required, if transmission takes place only in one direction at a time. The network can also be implemented without protection directions, but then some of the benefits offered by the network are, naturally, lost.

What is claimed is:

1. An optical telecommunications network comprising several nodes connected to one another by optical transmission paths that form several working rings, each of which passes via each node, in which network information is transmitted at several different wavelengths, wherein the network comprises a group of nodes including N nodes, a group of working rings including N rings, and a group of wavelengths including N wavelengths in such a way that each node in the group of nodes is configured to transmit signals at one wavelength in the group of wavelengths to all rings in the group of rings except to the ring from which it receives signals, and to receive signals at all wavelengths in the group of wavelengths except for its own transmitting wavelength from both directions in only one of the rings in the group of rings, whereby each node has an individual wavelength specific to the node, the wavelength being one of the wavelengths in the group of wavelengths, and a reception ring specific to the node, from which the other nodes in the group of nodes do not receive.

2. A telecommunications network according to claim 1, wherein each node is configured to transmit in only one direction at a time and that the network comprises the means specific to each node, allowing the direction of transmission from an individual node to an individual ring to be reversed.

3. A telecommunications network according to claim 2, wherein, in normal operation when no faults exist in the network, the directions of transmission of the nodes are selected so that the signals travelling in opposite directions between the nodes use the same route.

4. A telecommunications network according to claim 1, wherein each node is configured to transmit simultaneously in both directions to those rings to which the node involved is configured to transmit, and that the direction of reception at the node is selected specifically to each individual wavelength.

5. A telecommunications network according to claim 1, wherein the number of nodes is at least four.

* * * * *